Figure 1:
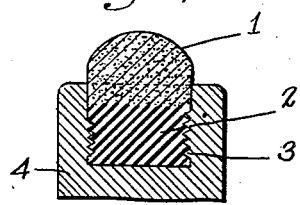

K. BROWN.
ARTICLE COMPOSED PARTLY OF RUBBER.
APPLICATION FILED APR. 30, 1917.

1,250,959.

Patented Dec. 25, 1917.

2 SHEETS—SHEET 1.

Inventor
Kirk Brown
By his Attorney

K. BROWN.
ARTICLE COMPOSED PARTLY OF RUBBER.
APPLICATION FILED APR. 30, 1917.
1,250,959.
Patented Dec. 25, 1917.
2 SHEETS—SHEET 2.
Fig. 5,
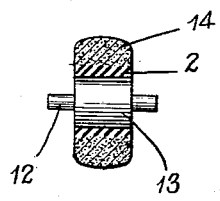
Fig. 6
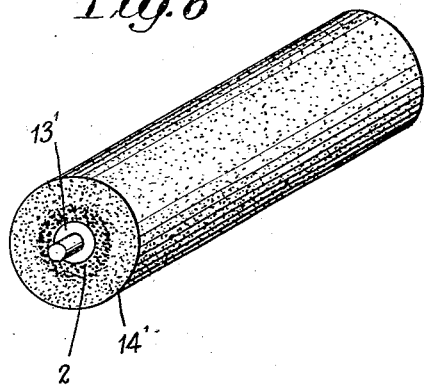
Fig. 7,
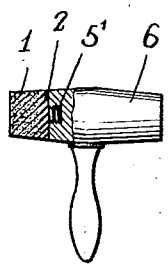
Fig. 8,
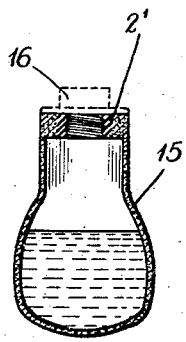
Fig. 9,
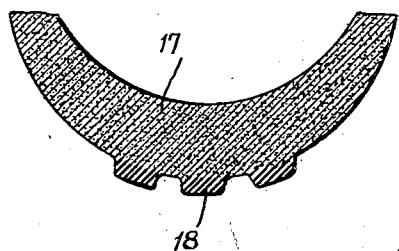
Inventor
Kirk Brown
By his Attorney

UNITED STATES PATENT OFFICE.

KIRK BROWN, OF MONTCLAIR, NEW JERSEY, ASSIGNOR TO CONDENSITE COMPANY OF AMERICA, OF BLOOMFIELD, NEW JERSEY, A CORPORATION OF NEW JERSEY.

ARTICLE COMPOSED PARTLY OF RUBBER.

1,250,959.  Specification of Letters Patent.  Patented Dec. 25, 1917.

Application filed April 30, 1917. Serial No. 165,443.

*To all whom it may concern:*

Be it known that I, KIRK BROWN, a citizen of the United States, residing at Montclair, in the county of Essex and State of New Jersey, have invented certain new and useful Improvements in Articles Composed Partly of Rubber, of which the following is a specification.

My invention relates to the manufacture of articles of varying character in all of which parts or devices formed of soft rubber or semi-soft rubber are to be secured to parts or devices formed of materials to which it has been found difficult to secure soft rubber. Soft rubber may not be provided with screw-threads on its surface for attachment to metal, or other parts, nor can it effectively be secured to a backing or other device by screws or bolts or other securing devices embedded therein. Difficulties often arise when it is attempted to cement soft rubber parts to other materials, and soft rubber articles are often liable to become displaced when held in position by wedging or compressing the same into overlying retaining devices.

My invention overcomes these difficulties in a simple and effective manner, by employing in each such instance a bond or securing device comprising a phenolic condensation product. Such products are commonly formed by the reaction of phenol and formaldehyde, or other substance containing the methylene radical in condition to unite with the phenol, and in their final state, when suitable proportions of reagents have been employed, are hard, strong and infusible. These products have the property of uniting with either soft or hard rubber with an unusually tenacious bond when pressed against the same and sufficiently heated, as in the process of finally curing or imparting the final reaction to the condensation product.

By taking advantage of this property, and the facility with which the condensation product may be molded or otherwise formed into a desired configuration, a large variety of articles may be made in which rubber articles, such as various cushioning devices, are united to supports or other devices formed of materials to which it is ordinarily difficult to secure soft rubber. It should be noted that soft rubber will not adhere directly to metals and to various other materials.

My invention may be practised in a number of ways and in the formation of a large variety of articles. Thus, in the manufacture of door stops or door holders, and in providing rubber cushions for the ends of crutches, chair legs and the like, the soft rubber cushion may be autogenously bonded or secured to a backing or member formed of a phenolic condensation product, which may be provided with an external screw-thread which may be screwed into a suitable socket in the chair leg or other support, or member formed of metal or wood or other desired material. Or the condensation product backing or bonding member for the rubber article may have the head of a metallic screw inset in the composition and molded therein, the screw being screwed into the article to which the rubber device is to be secured. The invention may be applied to the tires of vehicles in various ways. Thus, a solid rubber tire may have a backing of condensation product autogenously secured thereto, and bolts having their heads embedded in the condensation product may be used for securing the tire to the felly of the wheel. Or, as another example, the condensation product backing may be fitted on a metallic rim and securely held therein by screws passing through the rim into the condensation product. Rollers having outer surfaces of soft rubber and small wheels for trucks and other purposes having rubber tires may be formed by molding the article, with a layer of condensation product interposed between the hub or shaft of metal or other material and the outer layer of rubber, the condensation product and the rubber becoming autogenously bonded together and the condensation product firmly binding upon or shrinking about the hub or shaft in the process of manufacture. The above examples are given merely as illustrations of my invention, which is applicable to a wide range of uses.

As another example of my invention, antiskid or wearing-surface devices may be provided on the treads of tires for automobiles, etc., by autogenously securing protuberances of a phenolic condensation product to the tread of the tire, to which metal tread plates may be secured, if desired.

Figure 3:
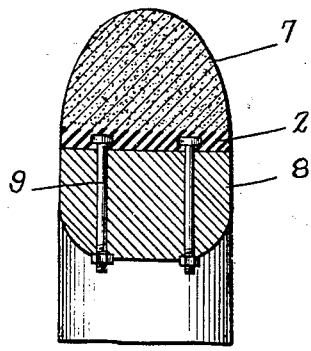
Figure 4:
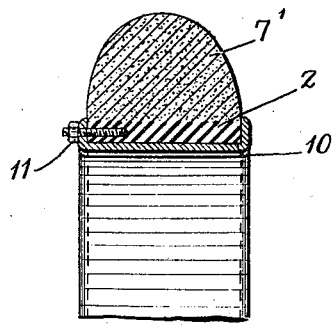

In order that a clearer understanding of my invention may be had, attention is hereby directed to the accompanying drawings forming part of this application and illustrating certain embodiments of my invention. In the drawings, Figure 1 represents a section through a cushioning device, Fig. 2 is a similar view in which the cushioning device is secured to its support in a different manner, Figs. 3 and 4 are sections showing applications of the invention to the mounting of tires, Fig. 5 is a cross-section through a small wheel, Fig. 6 is a perspective view illustrating a roller, Fig. 7 is a section through a mallet, Fig. 8 is a section through a rubber bag or bottle, and Fig. 9 is a section through a tire having anti-skid devices secured thereto.

Referring to the drawings, in Fig. 1 is illustrated a cushioning device in which the soft rubber cushion 1 is autogenously secured to a backing or bonding device 2 formed of a phenolic condensation product which is formed with a peripheral screw-thread 3. The screw-threaded backing is adapted to be screwed into a socket in the support 4, which may be a metallic or wooden article, or article of other material, such as a chair leg, crutch, metal support for a door stop, or a door holder or the like. In the manufacture of this device, the rubber article 1 may be placed in a suitable mold, together with material, which, upon being sufficiently heated, will harden to form the phenolic condensation product backing 2. The rubber may be cured in the mold, or may be placed in the mold in fully cured condition, and the material of which the article 2 is formed may be a partial phenolic condensation product adapted to be hardened to its final infusible state under the application of heat or heat and pressure; or it may be a mixture of a fusible phenol resin and a hardening agent therefor, such as paraformaldehyde or hexamethylenetetra-amin. Or the condensation product article 2 may be of the final infusible variety containing an ingredient or ingredients such that the article will soften somewhat when subjected to heat and pressure in the mold. In any case, the result of the molding operation is to autogenously bond the articles 1 and 2 together with an exceedingly tenacious union. The screw-thread represented in the drawing may be formed in the mold, or may be subsequently machined if desired. The condensation product portion of the article may have an inert filling material incorporated therewith and may have solid solvent ingredients, such, for example, as naphthalene and various of its compounds.

Figure 2:
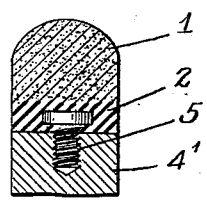

A modification is illustrated in Fig. 2, in which the cushioning device 1 is secured to the support 4' by means of a screw 5, the head of which is embedded in the backing 2 formed of a phenolic condensation product during the process of molding.

A similar application is illustrated in Fig. 7, in which a mallet having a body portion 6 formed of wood or metal or other material is provided with a soft rubber face 1. The face portion 1 has the condensation product backing 2 autogenously bonded thereto, and this backing 2 has a screw-threaded portion 5' screwed into a suitable socket in the body portion 6 of the mallet. The screw-threaded portion 5' may be formed as an integral part of the backing 2, or it may be a metal screw, the head of which is embedded in the backing 2. Such mallets or implements may be used for games, such as croquet, or for mechanics' mallets or other purposes.

In Fig. 3 a solid rubber tire 7 is illustrated as having a backing 2 formed of a phenolic condensation product autogenously bonded thereto, the backing 2 being seated against a felly 8 of a wheel and secured thereto by means of bolts 9 which extend through the felly, these bolts having their heads embedded in the backing 2. In Fig. 4 a tire 7' is illustrated as provided similarly with a condensation product backing 2 which is seated between the flanges of a metal rim 10 of a wheel, a plurality of screws, such as 11, extending through the flanges of the rim into molded internally screw-threaded sockets formed in the backing 2. In such instances, the tires with their backings may be formed and applied in sections to the wheels where this is desirable.

In Fig. 5 a small wheel is illustrated, comprising the metal shaft 12, having a hub 13, about which is formed the backing 2 of a phenolic condensation product, which in turn is surrounded by the soft rubber tire 14. The parts may be placed in a suitable mold, as described, with the result that the rubber tire is firmly bonded to the backing 2 which is packed tightly about the hub 13 and grips the latter tightly as a result of the slight shrinkage of the material of which the backing 2 is formed, during the hardening process. In Fig. 6 is illustrated a pressure roller in which the outer material 14' of rubber of the roller is secured to the backing 2 of a condensation product which is molded about hub 13' of the roller in the manner just described.

In Fig. 8, I have illustrated a bag or bottle 15 formed of soft rubber and having an annulus 2' of a phenolic condensation product autogenously secured within the neck of the bottle in the manner described. This annulus 2' may be formed with an internally screw-threaded opening in which a stopper or cap indicated at 16 may be screwed, this bottle being adapted for use as a hot water bottle or the like.

In Fig. 9 I have illustrated the tread portion of a rubber automobile tire 17, having protuberances 18 of a phenolic condensation product autogenously secured to the tread thereof, as previously described. These may be of desired shape, be secured over the wearing-surface, and serve to prevent skidding, and also prolong the life of the tire. When desired, plates of metal or other material may be secured to the condensation product protuberances 18, to form tread surfaces, these being secured by methods already described, as by having the same molded into the condensation product, or screwed into sockets formed therein.

Numerous other applications of my invention will be apparent from a consideration of the principles upon which the foregoing description is based.

What I claim is:

1. In articles of the character described, the combination of a soft rubber article and a backing therefor comprising a phenolic condensation product, autogenously secured thereto, said backing being adapted and formed to be secured to a metallic or other device to which said rubber article is intended to be secured, substantially as set forth.

2. In articles of the character described, the combination of an article formed of soft rubber, a support therefor, formed of a material to which it is difficult to secure soft rubber, and a fastening means for the same comprising a body formed of a phenolic condensation product, autogenously bonded to the rubber article, and so shaped and formed as to be readily secured to said support, substantially as set forth.

3. In articles of the character described, the combination of an article formed of soft rubber, a device to which the same is to be secured, formed of a material to which it is difficult to secure soft rubber, and a bond comprising a body formed of a phenolic condensation product, interposed between said article and device, autogenously secured to said article, and so shaped and formed as to be readily secured to said device, substantially as set forth.

4. In articles of the character described, the combination of a soft rubber article and a fastening device therefor, comprising a phenolic condensation product, autogenously secured thereto, and so shaped and formed as to be readily secured to a metallic or other article, substantially as set forth.

5. In articles of the character described, the combination of a rubber cushioning article, a support therefor, and a bond comprising a body formed of a phenolic condensation product, autogenously secured to said article and carrying a screw-thread for securing the same to said support, substantially as set forth.

6. In articles of the character described, the combination of a rubber article, a device to which the same is to be secured, and a bond comprising a body formed of a phenolic condensation product, autogenously secured to said article, and so formed as to be separably united to said device by threaded coacting surfaces, substantially as set forth.

7. In articles of the character described, the combination of a rubber article, a device to which the same is to be secured, and a bond comprising a body formed of a phenolic condensation product, autogenously secured to said article, and screw-threaded securing means connecting together said bond and device, substantially as set forth.

8. In articles of the character described, the combination of a rubber cushioning article, a support therefor, and a bond comprising a body formed of a phenolic condensation product, autogenously secured to said article, interposed between said article and support, and secured to the latter, substantially as set forth.

9. The process of forming an article comprising a soft rubber part and a device to which it is difficult to secure soft rubber, comprising interposing a bond between the same, comprising a body formed of a phenolic condensation product, and autogenously securing the same to the rubber part, said bond being adapted to be readily secured to said device, substantially as set forth.

This specification signed and witnessed this 26th day of April, 1917.

KIRK BROWN.

Witnesses:
 DYER SMITH,
 I. McINTOSH.